United States Patent
He

(10) Patent No.: US 6,856,790 B1
(45) Date of Patent: Feb. 15, 2005

(54) RECEIVER WITH DUAL D.C. NOISE CANCELLATION CIRCUITS

(75) Inventor: Runsheng He, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 09/536,120

(22) Filed: Mar. 27, 2000

(51) Int. Cl.[7] ............................................. H04B 15/00
(52) U.S. Cl. .................... 455/63.4; 455/276; 455/226.4
(58) Field of Search ............................. 455/63.1, 63.2, 455/67.13, 67.16, 423, 353, 151.2, 152.1, 252.1, 296, 283–288, 219, 222, 277.2, 278.1, 298, 317, 501

(56) References Cited

U.S. PATENT DOCUMENTS

| | | | |
|---|---|---|---|
| 4,486,740 A | * 12/1984 | Seidel | 341/57 |
| 5,095,496 A | * 3/1992 | Jang | 375/242 |
| 5,140,699 A | * 8/1992 | Kozak | 455/84 |
| 5,471,665 A | * 11/1995 | Pace et al. | 455/343.2 |
| 5,687,229 A | * 11/1997 | Sih | 379/406.09 |
| 5,724,653 A | * 3/1998 | Baker et al. | 455/296 |
| 5,867,062 A | * 2/1999 | Kudou | 330/124 R |
| 5,903,853 A | * 5/1999 | Sano | 455/570 |
| 6,009,126 A | * 12/1999 | Van Bezooijen | 375/319 |
| 6,219,088 B1 | * 4/2001 | Liu et al. | 348/21 |
| 6,311,051 B1 | * 10/2001 | Jung | 455/296 |
| 6,697,611 B1 | * 2/2004 | Franca-Neto | 455/296 |

* cited by examiner

Primary Examiner—Tilahun Gesesse

(57) ABSTRACT

A circuit employing dual adaptive D.C. noise cancellation loops to eliminate D.C. noise from a signal received from a communication channel. The circuit employing the two adaptive D.C. noise cancellation loops is constructed such that the two adaptive D.C. noise cancellation loops are decoupled to insured stability of the circuit while eliminating the D.C. noise components from a signal received from a communication channel. A first D.C. noise canceler generates a first D.C. noise cancellation signal that is a product of an error signal that is an estimate of noise within the signal and a first D.C. gain constant. The first D.C. Noise is connected within the receiver to an input of a decision circuit that subtractively combines the first D.C. noise cancellation signal with the signal to remove a first portion of the D.C. noise components. A second D.C. noise canceler additively restores the first D.C. noise cancellation signal to the error signal and multiplies the restored error signal with the first D.C. noise cancellation signal by a second D.C. gain constant. The second D.C. noise canceler is connected to the input of the receiver to subtractively combine the received signal acquired from the communication channel with the second D.C. noise cancellation signal to remove a second portion of the D.C. noise components.

44 Claims, 4 Drawing Sheets

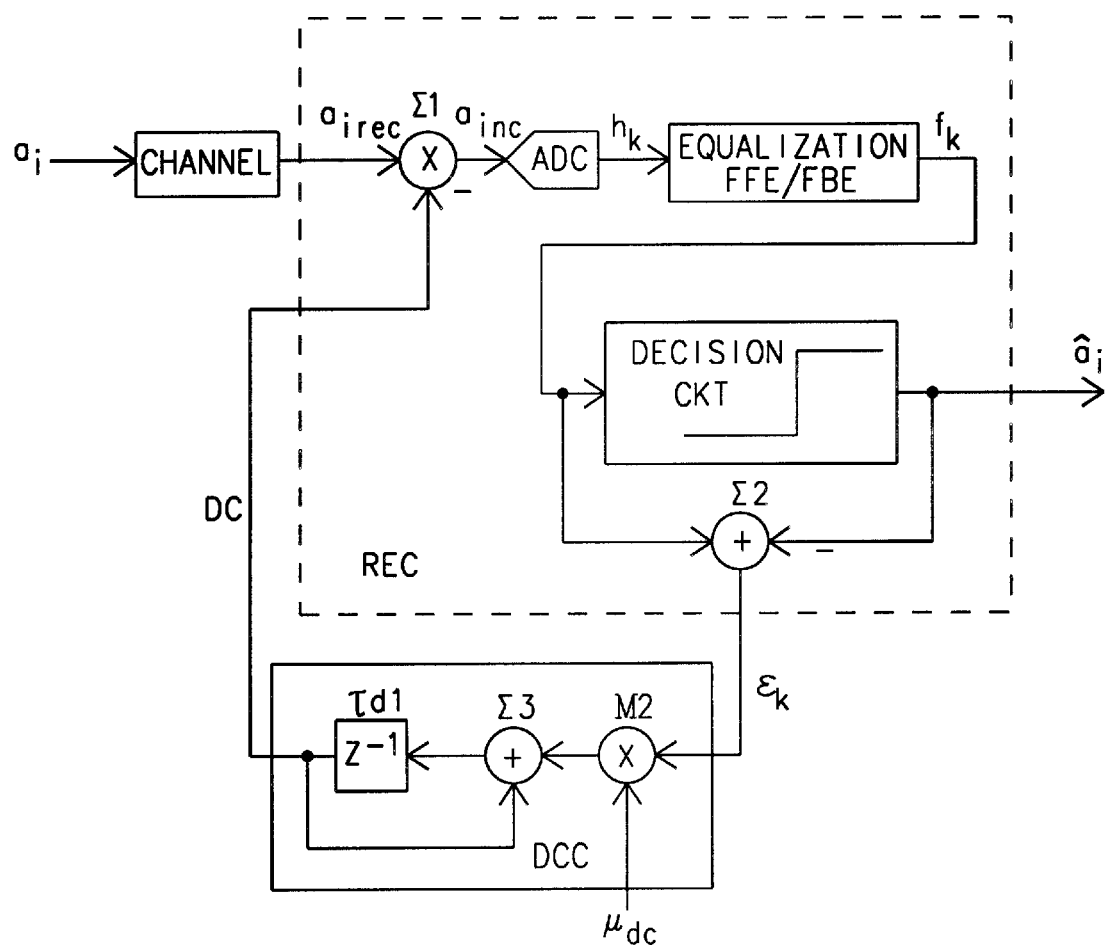
FIG. 1 - Prior Art

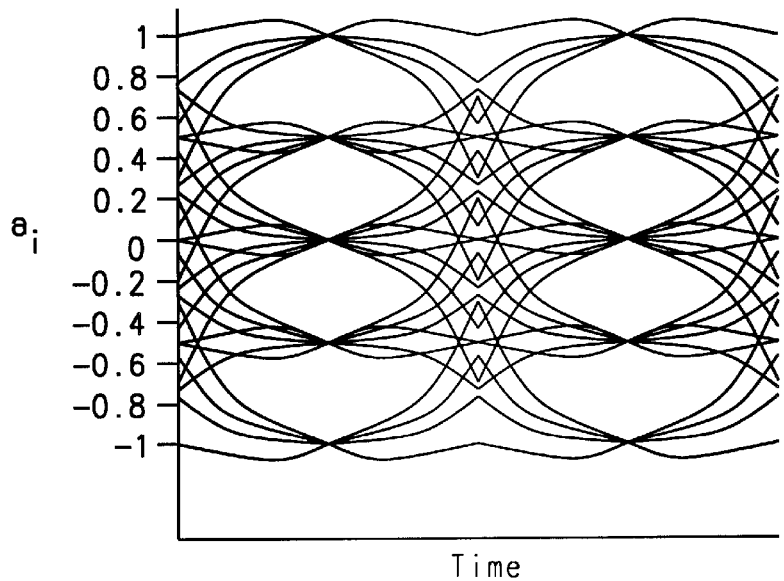
*FIG. 2a - Prior Art*
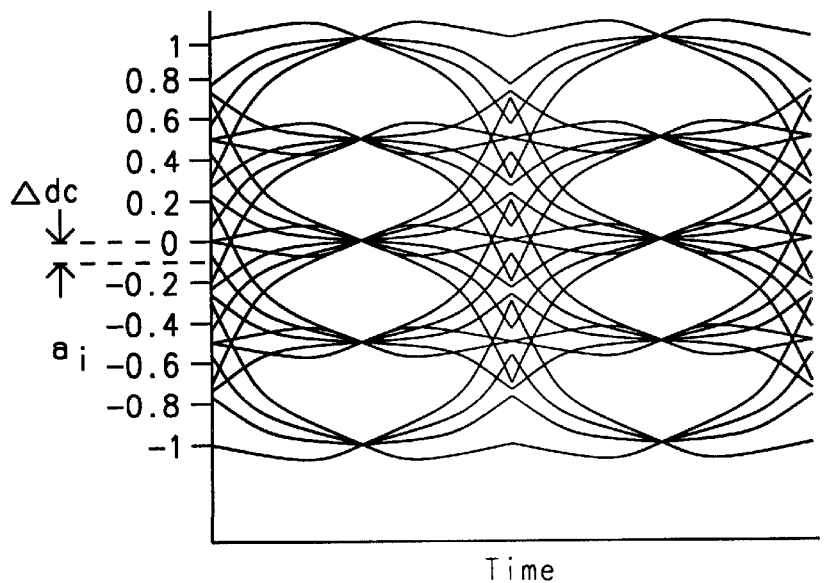
*FIG. 2b - Prior Art*

RECEIVER WITH DUAL D.C. NOISE CANCELLATION CIRCUITS

BACKGROUND OF THE INVENTION

1. Field of the Invention

This invention is related to noise reduction in communication systems such as Ethernet. More particularly, this invention is related to reduction of D.C. noise components in a signal received from a communication channel.

2. Description of the Related Art

The structures of digital communications such as Ethernet, as described in the Institute of Electrical and Electronic Engineers (IEEE) specification IEEE 802.3, are well known in the art. To improve reception of signals from a communication channel, noise components must be determined and subtracted from the received signal. One of the noise components induced within the communication channel is referred to as D.C. noise. Refer to FIGS. 2a and 2b to understand the definition and the effect of D.C. noise components on the received signal $a_i$. FIG. 2a shows an eye diagram of a received signal a, of a five-level amplitude-modulated signal. Each voltage level represents one of the values of the digital signal being transferred. In an ideal communication system, each "eye" of the eye diagram would be nearly rectangular. The more "closed" the "eye," the more noise induced on the communication channel. Low frequency or D.C. noise components that are a result of the encoding of the digital data or that are induced on the communication channel may actually shift the D.C. voltage level as shown in FIG. 2b. In this example, the whole signal $a_i$ is shifted by a D.C. voltage level $\Delta_{dc}$. The effect of the D.C. noise components is to degrade the performance of the circuitry that decoded the received signal $a_i$ to recover the digital data. This implies a higher error rate of the data received, thus requiring more robust error recovery and slower data transmission.

Further, as can be seen in FIG. 2b, the receiver must have a wider dynamic range. That is the voltage range that the receiver recognizes, as the signal $a_i$ must be larger.

Refer now to FIG. 1 for a discussion of a receiver and a D.C. noise cancellation circuit of the prior art. The multiple level amplitude-modulated signal $a_i$ is transferred to the communication channel. The received signal $a_{irec}$ having D.C. noise components, as shown in FIG. 2b, is the input to the receiver. Typically, it is desirable to remove as much of the D.C. noise components as early as possible in the receiving of the signal $a_{irec}$. Typically, a D.C. noise canceling signal is subtractively combined in a first summing circuit $\Sigma 1$ with the received signal $a_{irec}$ to remove the D.C. noise components. The signal $a_{inc}$ with the D.C. noise components removed is the input to the analog-to-digital converter.

The analog-to-digital converter creates a set of sampled digital data $h_k$ indicating the amplitude of the received signal $a_{inc}$ with the D.C. noise components removed. The sampled digital data is created at discrete periods of a sampling clock and is retained or buffered as needed in a memory or registers (not shown).

As is known in the art, the communication channel acts as a lowpass filter causing what is termed intersymbol interference where noise components from adjacent symbols of the encoded data interfere with the current symbol. The feed-forward or feedback equalizer removes any of the intersymbol interference to create the equalized sampled digital data of the received signal $f_k$. The equalized sampled digital data $f_k$ is the input of the decision circuit that determines an estimate of the transmitted value of the signal $â_k$.

An error signal $\epsilon_k$ is determined as the difference between the equalized sampled digital data $f_k$ and the estimated value of the signal $â_k$. The equalized sampled digital data $f_k$ and the estimated values of the signal $â_k$ are the inputs to the second summing circuit $\Sigma 2$. The second summing circuit $\Sigma 2$ subtractively combines the equalized sampled digital data $f_k$ and the estimated values of the signal $â_k$ to form the error signal $\epsilon_k$.

The error signal $\epsilon_k$ is used to determine the level of the D.C. noise component that needs to be removed from the received signal.

The error signal $\epsilon_k$ is the input to the D.C. noise canceling circuit DCC. The error signal, further, is the input of the multiplier circuit M1. The second input of the multiplier circuit M1 is a gain constant $\mu_{dc}$. The gain constant $\mu_{dc}$ is chosen to be sufficiently small to make the noise cancellation stable, but sufficiently large to track any slow variation in the D.C. voltage level of the received signal $a_{irec}$. The range of the gain constant $\mu_{dc}$ is dependent on the condition of the communication channel.

The output of the multiplier circuit M1 is one input of a third summing circuit $\Sigma 3$. The second input of the third summing circuit $\Sigma 3$ is the value of the D. C. noise cancellation signal for the previous sample period, and the output of the third summing circuit $\Sigma 3$ is the D.C. noise cancellation signal for the previous sampling period of the received signal $a_{irec}$. The output of the third summing circuit $\Sigma 3$ is the input of the delaying circuit $\tau_{d1}$. The output of the delaying circuit $\tau_{d1}$ is the input to the first summing circuit $\Sigma 1$ to remove the D.C. noise component from the received signal $a_{irec}$.

U.S. Pat. No. 4,486,740 (Seidel) describes a circuit for DC noise cancellation in ternary-coded data systems. An encoder processes an input signal to produce a ternary coded data stream having suppressed DC. The data stream is augmented with a compensating set of code symbols as determined by the number of positive and negative code symbols in the data stream as well as all prior compensating code symbols. A decoder processes the received signal to extract the symbols in the data stream corresponding to the input signal. In order to achieve a preselected end-to-end transmission rate with the encoder-decoder combination, the rate of the signal propagated between encoder and decoder is increased to compensate for the appended code symbols.

SUMMARY OF THE INVENTION

It is an object of this invention to provide a circuit to eliminate D.C. noise from a signal received from a communication channel.

Another object of this invention is to provide a circuit employing dual adaptive D.C. noise cancellation loops to eliminate D.C. noise from a signal received from a communication channel.

An additional object of this invention is to provide a circuit employing two adaptive D.C. noise cancellation loops that are decoupled to insured stability of the circuit while eliminating D.C. noise components from a signal received from a communication channel.

To accomplish these and other objects a circuit within a receiver of a communication system is provided for removing D.C. noise components from a signal acquired by the receiver. The circuit has a first D.C. noise canceler that generates a first D.C. noise cancellation signal. An input is connected within the receiver to an output of an error circuit, which determines an error signal that is an estimate of the D.C. noise within the signal. The first D.C. noise canceler has an output connected within the receiver to an input of a decision circuit that subtractively combines the first D.C. noise cancellation signal with the signal to remove a first portion of the D.C. noise components. The circuit has a second D.C. noise canceler with an input to receive the first D.C. noise cancellation signal, a second input connected to the output of the error circuit to receive the error signal, and an output connected to the input of the receiver to subtractively combine the received signal acquired from the communication channel with the second D.C. noise cancellation signal to remove a second portion of the D.C. noise components.

The first D.C. noise canceler forms the first noise cancellation signal as a function of the error signal according to the formula:

$$DC1_{n+1} = DC1_n + \mu_{dc1} \times \epsilon_k$$

Where:
- $DC1_n$ is the first noise cancellation signal for the current sampling time of the received signal.
- $DC1_{n+1}$ is the first noise cancellation signal for the next sampling time of the received signal.
- $\mu_{dc1}$ is a first loop gain constant.
- $\epsilon_k$ is the error signal determined by the formula:

$$\epsilon_k = f_{knc} - \hat{a}_k$$

where:
- $\hat{a}_k$ is the estimated value of the transmitted signal.
- $f_{knc}$ is an equalized, noise cancelled received signal of the current sampling.

The second D.C. noise canceler forms the second noise cancellation signal as a function of the error signal according to the formula:

$$DC2_{n+1} = DC2_n + \mu_{dc1} \times (\epsilon_k + DC1_n)$$

Where:
- $DC2_n$ is the second noise cancellation signal for the current sampling time of the received signal.
- $DC2_{n+1}$ is the second noise cancellation signal for the next sampling time of the received signal.
- $\mu_{dc2}$ is a second loop gain constant.
- $\epsilon_k$ is the error signal determined by the formula:

$$\epsilon_k = f_{knc} - \hat{a}_k$$

where:
- $\hat{a}_k$ is the estimated value of the transmitted signal.
- $f_{knc}$ is an equalized, noise cancelled received signal of the current sampling.
- $DC1_n$ is the first noise cancellation signal for the current sampling time of the input signal.

The first D.C. noise canceler includes a first multiplication circuit, which is connected to the input to receive the error signal and to multiply the error signal by a first loop gain constant to produce a first product. The first product is an input to a first additive combining circuit. The first additive combining circuits is additionally connected to the output of the first D.C. noise canceler to receive a current first D.C. noise cancellation signal. The first additive combining circuit additively combines the first product with the current first D.C. noise cancellation signal to produce a next first D.C. noise cancellation signal. A first unit delay circuit is connected to the first additive combining circuit to delay the first D.C. noise cancellation signal by one sampling time.

The second D.C. noise canceler has a second additive combining circuit connected to receive the error signal at the first input and to receive the first D.C. noise cancellation signal at the second input. The error signal and the first D.C. noise cancellation signal are additively combined to form a first sum, which restores the first D.C. noise cancellation signal to the error signal. A second multiplication circuit is connected to the second additive circuit to receive the first sum and to multiply the first sum by a gain constant to produce a second product. Connected to the second multiplication circuit is a third additive combining circuit to receive the second product and to the output of the second D.C. noise canceler to receive a current second D.C. noise cancellation signal. The third additive combining circuit additively combines the second product with the current second D.C. noise cancellation signal to produce a next second D.C. noise cancellation signal. Connected to the output of the third additive combining circuit is a second unit delay circuit to delay the second D.C. noise cancellation signal by one sampling time.

The first and second loop gain constants are chosen to have values that are sufficiently small to insure stable operation of the first and second noise cancelers. However, the first and second loop gain constants must be sufficiently large to track any slow variation in the level of the D.C. noise present in the received signal.

BRIEF DESCRIPTION OF THE DRAWINGS

FIG. 1 is a system schematic diagram of a receiver of the prior art.

FIGS. 2a and 2b are eye diagrams of a signal received from a communication channel.

DETAILED DESCRIPTION OF THE INVENTION

A drawback of an adaptive loop created by the D.C. noise canceling circuit of FIG. 1 is the large time latency from the analog-to-digital converter of FIG. 1 to the decision circuit of FIG. 1. The long time latency results in less accuracy in the determination of the D.C. noise component and thus allowing a residual D.C. noise component to remain.

A solution to the long time latency of a single adaptive loop is a dual adaptive loop terminating at the input of the decision circuit of FIG. 1. A second potential problem in using two adaptive loops to cancel the D.C. noise is that the two loops are coupled together and can cause stability problems.

Figure 3:
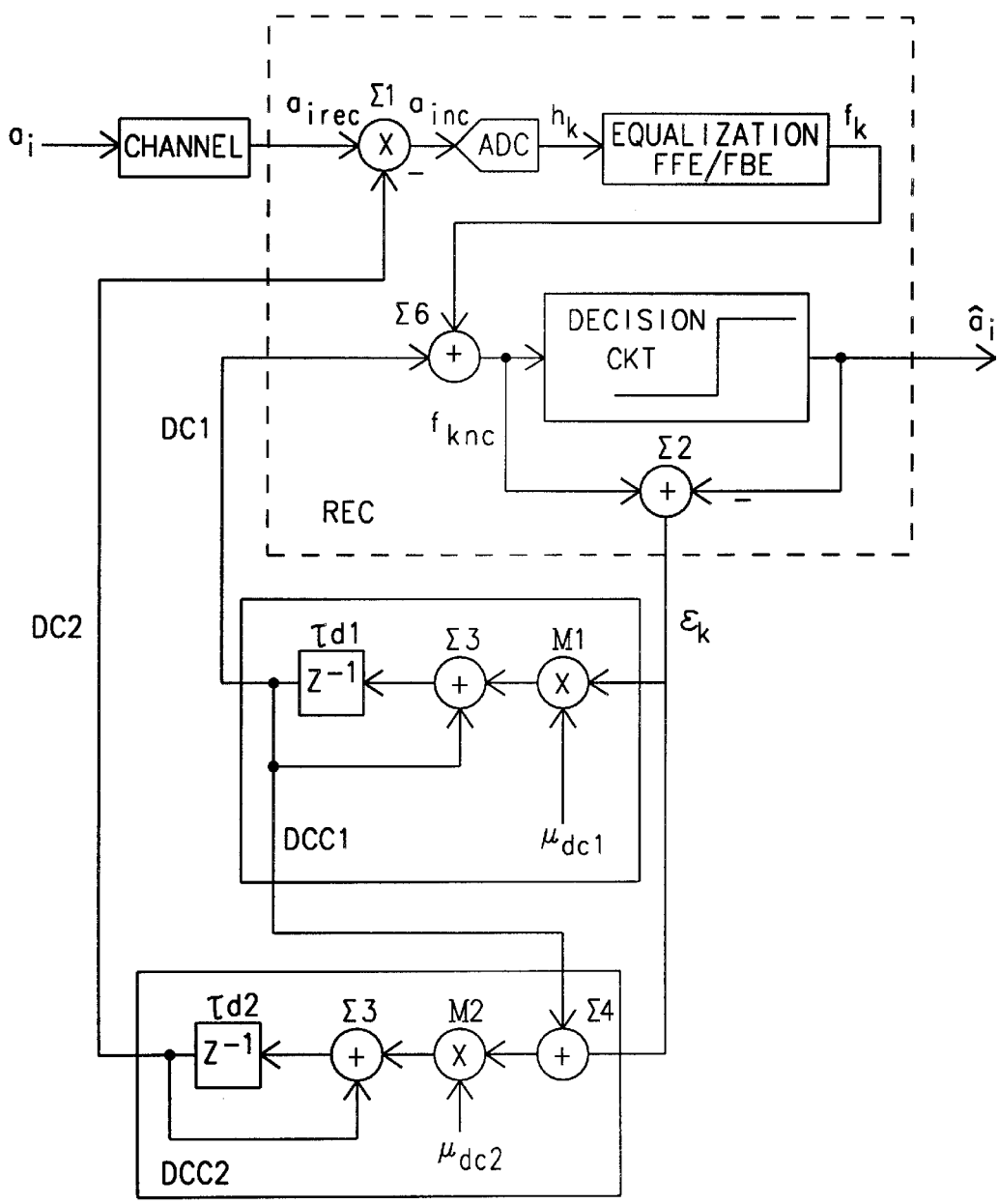
FIG. 3 is a system schematic diagram of a receiver having noise cancellation circuitry of this invention.

Refer now to FIG. 3 for a discussion of a receiver within a communication circuit containing two D.C. noise cancellation circuits. The basic receiver structure is as described above in FIG. 1 with a signal $a_i$ traversing a communication channel to the input of the receiver. The analog-to-digital converter samples the received signal having D.C. noise components removed periodically and converts these samples to a sampling digital data $h_k$ indicating the amplitude of the received signal $a_{i_{rec}}$ at the sampling times. The sampled digital data $h_k$ is transferred to the feed-forward/ feedback equalization circuit for removal of intersymbol interference noise components to create an equalized sampled digital data $f_k$. The equalized sampled digital data $f_k$ is then conveyed to the decision circuit where it is decoded. The decision circuit is, as described above, a Viterbi trellis decoding circuit. The output of the decision circuit is an estimate of the original signal $â_k$.

An error signal $\epsilon_k$ is generated as a difference between the estimated original signal $â_k$ and the equalized sampled digital data $f_k$. This is accomplished in the second summing circuit $\Sigma 2$. The inputs of the second summing circuit $\Sigma 2$ are the estimated original signal $â_k$ and the equalized sampled digital data that has had the D.C. noise removed $f_{knc}$. The second summing circuit $\Sigma 2$ subtractively combines the estimated original signal $â_k$ and the equalized sampled digital data with the D.C. noise removed $f_{knc}$ to form the error signal $\epsilon_k$.

The first D.C. noise cancellation signal DC1 is the D.C. noise cancellation signal that has the smallest time latency and is subtractively combined with the equalized sampled digital data $f_k$ at the summing circuit $\Sigma 6$. The first D.C. noise cancellation signal DC1 is formed as a function of the error signal $\epsilon_k$ in the first noise cancellation circuit DCC1. The first D.C. noise cancellation circuit performs the function to create the D.C. noise cancellation signal DC1 according to the formula:

$$DC1_{n+1} = DC1_n + \mu_{dc1} \times \epsilon_k$$

Where:
$DC1_n$ is the first noise cancellation signal for the current sampling time of the received signal.
$DC1_{n+1}$ is the first noise cancellation signal for the next sampling time of the received signal.
$\mu_{dc1}$ is a first loop gain constant.
$\epsilon_k$ is the error signal determined by the formula:

$$\epsilon_k = f_{knc} - â_k$$

where:
$â_k$ is the estimated value of the transmitted signal.
$f_{knc}$ is an equalized, noise cancelled received signal of the current sampling.

To minimize the complexity of the design of the D.C. noise cancellation circuit, the second D.C. noise cancellation signal DC2 is subtractively combined with the received signal $a_{irec}$ to eliminate a portion of the D.C. noise from the received signal $a_{irec}$. The second D.C. noise cancellation circuit DCC2 forms the second D.C. noise cancellation signal as a function of the error signal $\epsilon_k$ in combination with the first D.C. noise cancellation signal to effectively decouple the first and second D.C. noise cancellation circuits DCC1, DCC2. The second D.C. noise cancellation circuit DCC2 executes the formula:

$$DC2_{n+1} = DC2_n + \mu_{dc1} \times (\epsilon_k + DC1_n)$$

Where:
$DC2_n$ is the second noise cancellation signal for the current sampling time of the received signal.
$DC2_{n+1}$ is the second noise cancellation signal for the next sampling time of the received signal.
$\mu_{dc2}$ is a second loop gain constant.
$\epsilon_k$ is the error signal determined by the formula:

$$\epsilon_k = f_{knc} - â_k$$

where:

$â_k$ is the estimated value of the transmitted signal.
$f_{knc}$ is an equalized, noise cancelled received signal of the current sampling.
$DC1_n$ is the first noise cancellation signal for the current sampling time of the received signal.

The first and second loop gain constants $\mu_{dc1}$ and $\mu_{dc2}$ are chosen to have value that is sufficiently small to insure stable operation of the first and second noise cancellation circuits DCC1, DCC2. However, the first and second loop gain constants $\mu_{dc1}$, $\mu_{dc2}$ must be sufficiently large to track any slow variation in the level of the D.C. noise present in the received signal $a_{irec}$.

The first D.C. noise cancellation circuit DCC1 has a first multiplying circuit M1. The input of the multiplying circuit are the error signal $\epsilon_k$ and the first loop gain constant $\mu_{dc1}$. The first multiplying circuit M1 multiplies the error signal $\epsilon_k$ and the first loop gain constant $\mu_{dc1}$ to form a first product at the output of the first multiplying circuit $M_1$.

The first product is an input of the third summing circuit $\Sigma 3$ where it is additively combined with the current level of the first D.C. noise cancellation signal $DC1_n$ to form a next first D.C. noise cancellation signal $DC1_{n+1}$. The next first D.C. noise cancellation signal $DC1_{n+1}$ is the input to the first delaying circuit $\tau_{d1}$ which delays the next first D.C. noise cancellation signal $DC1_{n+1}$ by one sampling period. The output of the first delaying circuit $\tau_{d1}$ is the input to the sixth summing circuit $\Sigma 6$, thus forming the adaptive loop at the decision circuit.

The fourth summing circuit $\Sigma 4$ additively combines its inputs, which are the error signal $\epsilon_k$ and the first D.C. noise cancellation signal DC1 to form a first sum. The fourth summing circuit effectively returns the first D.C. noise cancellation signal DC1 to the error signal $\epsilon_k$, thus decoupling the first and second D.C. noise cancellation circuits DCC1 and DCC2.

The first sum of the error signal $\epsilon_k$ and the first D.C. noise cancellation signal DC1 is multiplied in the second multiplying circuit M2 by a second loop gain constant $\mu_{dc2}$ to form a second product at its output. The second product is additively combined with the current second D.C. noise cancellation signal $DC2_n$ in the fifth summing circuit $\Sigma 5$ to form a next second D.C. noise cancellation signal $DC2_{n+1}$. The next second D.C. noise cancellation signal $DC2_{n+1}$ is the input to the second delaying circuit $\tau_{d2}$. The second delaying circuit $\tau_{d2}$ delays the next D.C. noise cancellation signal by one sampling time. The output of the delaying circuit is the input of the first combining circuit $\Sigma 1$ which subtractively combines the second D.C. noise cancellation signal DC2 with the received signal $a_{irec}$ at the next sampling time of the analog-to-digital converter.

It is well-known in the art that, while the above describes individual circuitry to implement an apparatus that removes the D.C. noise component of a received signal $a_{irec}$, the apparatus may be implemented as a program code for execution on a computational processor. The program code maybe obtained from media such as storage nodes of an internal or external network or stored on a storage media such as read only memory (ROM) or a magnetic disk. Further, while complex and difficult to implement, the apparatus to remove the D.C. noise components of a received signal may be constructed as analog filter circuits using continuous time processing.

Figure 4:
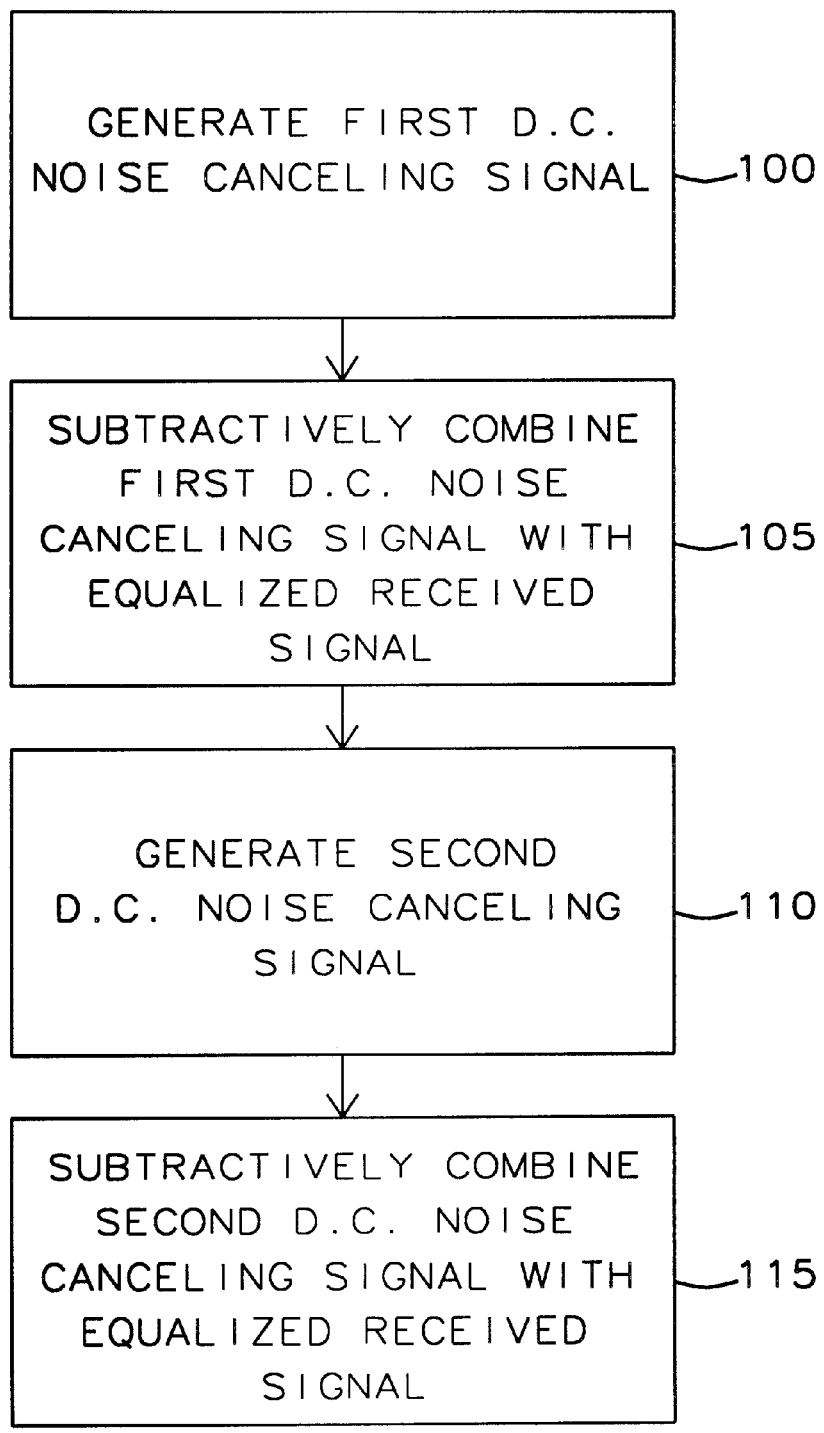
FIG. 4 is a process flow diagram of a method for noise canceling in a receiver of this invention.

The program code executed by the computational processor executes a method for removing D.C. noise components from a received signal described as shown in FIG. 4. The method to remove D.C. noise components from a signal received from a communication channel begins by generating a first D.C. noise cancellation signal 100 as a function of an error signal. The error signal is an estimate of noise within the signal as described above. The first D.C. noise cancellation signal is subtractively combined 105 with an equalized received signal thus removing a first portion of the D.C. noise components from the signal. A second D.C. noise cancellation signal is generated 110 as a function of the error signal and the first D.C. noise cancellation signal. Then subtractively combined 115 with the signal as it is received from the communication channel thus removing a second portion of the D.C. noise components from the received signal.

The generating the first D.C. noise cancellation signal 100 is formed as the function of the error signal according to the formula:

$$DC1_{n+1} = DC1_n + \mu_{dc1} \times \epsilon_k$$

Where:
$DC1_n$ is the first noise cancellation signal for the current sampling time of the received signal.
$DC1_{n+1}$ is the first noise cancellation signal for the next sampling time of the received signal.
$\mu_{dc1}$ is a first loop gain constant.
$\epsilon_k$ is the error signal determined by the formula:

$$\epsilon_k = f_{knc} - \hat{a}_k$$

where:
$\hat{a}_k$ is the estimated value of the transmitted signal.
$f_{knc}$ is an equalized, noise cancelled received signal of the current sampling.

The generating the second D.C. noise cancellation signal 110 is formed as a function of the error signal and the first D.C. noise cancellation signal according to the formula:

$$DC2_{n+1} = DC2_n + \mu_{dc1} \times (\epsilon_k + DC1_n)$$

Where:
$DC2_n$ is the second noise cancellation signal for the current sampling time of the received signal.
$DC2_{n+1}$ is the second noise cancellation signal for the next sampling time of the received signal.
$\mu_{dc2}$ is a second loop gain constant.
$\epsilon_k$ is the error signal determined by the formula:

$$\mu_k = f_{knc} - \hat{a}_k$$

where:
$\hat{a}_k$ is the estimated value of the transmitted signal.
$f_{knc}$ is an equalized, noise cancelled received signal of the current sampling.
$DC1_n$ is the first noise cancellation signal for the current sampling time of the received signal.

Further, the generating the first D.C. noise cancellation signal 100 is a method that begins by multiplying the error signal by a first loop gain constant to produce a first product. The first product is additively combined with a current first D.C. noise cancellation signal to produce a next first D.C. noise cancellation signal. The next first noise cancellation signal is delayed by one sampling time the next first D.C. noise cancellation signal.

The generating the second D.C. noise cancellation signal 110 is a method that begins by additively combining the error signal and the first D.C. noise cancellation signal to form a first sum which adds the first D.C. noise cancellation signal back to the error signal to decouple the generating of the first noise cancellation signal from the generating of the second noise cancellation signal. The method continues by multiplying the first sum by a second loop gain constant to produce second product. The second product is additively combined with a current D.C. noise cancellation signal to produce a next second D.C. noise cancellation signal, which is then delayed by one sampling time. The first and second loop gain constants are chosen to have values that are sufficiently small to insure stable operation of the first and second noise cancellation circuits. However, the first and second loop gain constants must be sufficiently large to track any slow variation in the level of the D.C. noise present in the received signal.

While this invention has been particularly shown and described with reference to the preferred embodiments thereof, it will be understood by those skilled in the art that various changes in form and details may be made without departing from the spirit and scope of the invention.

What is claimed is:

1. A noise canceling circuit for removing D.C. noise from an input signal received by a receiver having an error circuit which generates an error signal, said noise canceling circuit comprising:
   a first D.C. noise canceler to generate a first D.C. noise cancellation signal in response to the error signal from the error circuit,
      wherein the first DC noise cancellation signal is input to the error circuit; and
   a second D.C. noise canceler responsive to the error signal from the error circuit and the first D.C. noise cancellation signal from said first D.C. noise canceler to provide a second D.C. noise cancellation signal.

2. The noise canceling circuit of claim 1 wherein said first D.C. noise canceler comprises:
   a first multiplication circuit to multiply the error signal by a first gain constant to produce a first product;
   a first adder; and
   a first delay circuit responsive to an output from said first adder to generate the first DC noise cancellation signal, wherein said first adder adds an output from a first multiplication circuit to the first D.C. noise cancellation signal.

3. A noise canceling circuit for removing D.C. noise from an input signal received by a receiver having an error circuit which generates an error signal, said noise canceling circuit comprising:
   a first D.C. noise canceler to generate a first D.C. noise cancellation signal in response to the error signal from the error circuit,
      wherein the first DC noise cancellation signal is input to the error circuit,
      wherein said first D.C. noise canceler comprises:
         a first multiplication circuit to multiply the error signal by a first gain constant to produce a first product;
         a first adder; and
         a first delay circuit responsive to an output from said first adder to generate the first DC noise cancellation signal, wherein said first adder adds an output from a first multiplication circuit to the first D.C. noise cancellation signal;
      wherein the first D.C. noise cancellation signal is formed as a function of the error signal according to the formula:

$$DC1_n + 1 = DC1_n + \mu_{dc1} \times \epsilon_k$$

wherein:

DC1$_n$ is the first D.C. noise cancellation signal for the current sampling time of the input signal, DC1$_{n+1}$ is the first D.C. noise cancellation signal for the next sampling time of the input signal, $\mu_{dc1}$ is the first gain constant, and $\epsilon_k$ is the error signal from the error circuit; and a second D.C. noise canceler responsive to the error signal from the error circuit and the first D.C. noise cancellation signal from said first D.C. noise canceler to provide a second D.C. noise cancellation signal.

4. A noise canceling circuit for removing D.C. noise from an input signal received by a receiver having an error circuit which generates an error signal, said noise canceling circuit comprising:

a first D.C. noise canceler to generate a first D.C. noise cancellation signal in response to the error signal from the error circuit,
wherein the first DC noise cancellation signal is input to the error circuit; and a second D.C. noise canceler responsive to the error signal from the error circuit and the first D.C. noise cancellation signal from said first D.C. noise canceler to provide a second D.C. noise cancellation signal,
wherein said second D.C. noise canceler comprises:
a second adder to add the error signal from the error circuit to the first DC noise cancellation signal;
a second multiplication circuit to multiply an output of said second adder by a second gain constant;
a third adder; and
a second delay circuit responsive to an output of said third adder to provide the second D.C. noise cancellation signal,
wherein said third adder adds the second D.C. noise cancellation signal to an output of said second multiplier.

5. The noise canceling circuit of claim 4, wherein the second D.C. noise cancellation signal is formed as a function of the error signal and the first D.C. noise cancellation signal according to the formula:

$$DC2_n+1=DC2_n+\mu_{dc2}\times(\epsilon_k+DC1_n)$$

wherein

DC2$_n$ is the second D.C. noise cancellation signal for the current sampling time of the input signal, DC2$_{n+1}$ is the second D.C. noise cancellation signal for the next sampling time of the input signal, $\mu_{dc2}$ is the second gain constant, and $\epsilon_k$ is the error signal.

6. A receiver comprising:

an input circuit to receive an input signal;

an error circuit to provide an error signal;

a first D.C. noise canceler to generate a first D.C. noise cancellation signal in response to the error signal from said error circuit,
wherein said error circuit is responsive to the first DC noise cancellation signal; and a second D.C. noise canceler responsive to the error signal from the error circuit and the first D.C. noise cancellation signal from said first D.C. noise canceler to provide a second D.C. noise cancellation signal,
wherein said input circuit is responsive to said second D.C. noise canceler.

7. The receiver of claim 6, further comprising:
a feedforward/feedback equalizer responsive to the input circuit;

a first adder to subtract the first D.C. noise cancellation signal from said first D.C. noise canceler from an output of said feedforward/feedback equalizer;

a decision circuit that determines an estimate of input signal in response to an output of said first adder,
wherein said error circuit comprises:
a second adder to subtract an output of said decision circuit from the error signal output by said first adder.

8. The receiver of claim 7, wherein said first D.C. noise canceler comprises:

a first multiplication circuit to multiply an output of said second adder by a first gain constant to produce a first product;

a third adder; and a first delay circuit responsive to an output from said third adder to generate the first DC noise cancellation signal,
wherein said third adder adds an output from a first multiplication circuit to the first D.C. noise cancellation signal.

9. A receiver comprising:

an input circuit to receive an input signal;

a feedforward/feedback equalizer responsive to the input circuit;

an error circuit to provide an error signal;

a first D.C. noise canceler to generate a first D.C. noise cancellation signal in response to the error signal from said error circuit,
wherein said error circuit is responsive to the first DC noise cancellation signal;

a first adder to subtract the first D.C. noise cancellation signal from said first D.C. noise canceler from an output of said feedforward/feedback equalizer;

a decision circuit that determines an estimate of input signal in response to an output of said first adder,
wherein said error circuit comprises:
a second adder to subtract an output of said decision circuit from the error signal output by said first adder;
wherein said first D.C. noise canceler comprises:
a first multiplication circuit to multiply an output of said second adder by a first gain constant to produce a first product;
a third adder; and
a first delay circuit responsive to an output from said third adder to generate the first DC noise cancellation signal,
wherein said third adder adds an output from a first multiplication circuit to the first D.C. noise cancellation signal; and a second D.C. noise canceler responsive to the error signal from the error circuit and the first D.C. noise cancellation signal from said first D.C. noise canceler to provide a second D.C. noise cancellation signal,
wherein said input circuit is responsive to said second D.C. noise canceler,
wherein said second D.C. noise canceler comprises:
a fourth adder to add an output of said second adder to the first DC noise cancellation signal;
a second multiplication circuit to multiply an output of said fourth adder by a second gain constant;
a fifth adder; and
a second delay circuit responsive to an output of said fifth adder to provide the second D.C. noise cancellation signal, wherein said fifth adder adds the second D.C. noise cancellation signal to an output of said second multiplier, wherein said input circuit comprises a sixth adder to subtract the second D.C. noise cancellation signal from the input signal.

10. A receiver comprising:

an input circuit to receive an input signal;

a feedforward/feedback equalizer responsive to the input circuit;

an error circuit to provide an error signal;

a first D.C. noise canceler to generate a first D.C. noise cancellation signal in response to the error signal from said error circuit, wherein said error circuit is responsive to the first DC noise cancellation signal;

a first adder to subtract the first D.C. noise cancellation signal from said first D.C. noise canceler from an output of said feedforward/feedback equalizer;

a decision circuit that determines an estimate of input signal in response to an output of said first adder, wherein said error circuit comprises:

a second adder to subtract an output of said decision circuit from the error signal output by said first adder;

wherein said first D.C. noise canceler comprises:

a first multiplication circuit to multiply an output of said second adder by a first gain constant to produce a first product;

a third adder; and a first delay circuit responsive to an output from said third adder to generate the first DC noise cancellation signal, wherein said third adder adds an output from a first multiplication circuit to the first D.C. noise cancellation signal, wherein the first D.C. noise cancellation signal is formed as a function of the error signal according to the formula:

$$DC1_{n+1} = DC1_n + \mu_{dc1} \times \epsilon^k$$

wherein:

$DC1_n$ is the first D.C. noise cancellation signal for the current sampling time of the input signal, $DC1_{n+1}$ is the first D.C. noise cancellation signal for the next sampling time of the input signal, $\mu_{dc1}$ is the first gain constant, and $\epsilon_k$ is the error signal determined by the formula:

$$\epsilon_k = f_{knc} - \hat{a}_i$$

where:

$\hat{a}_i$ is the estimated value of the transmitted encoded signal from said decision circuit, and $f_{knc}$ is an equalized, noise cancelled received signal of the current sampling from said first adder; and a second D.C. noise canceler responsive to the error signal from the error circuit and the first D.C. noise cancellation signal from said first D.C. noise canceler to provide a second D.C. noise cancellation signal, wherein said input circuit is responsive to said second D.C. noise canceler.

11. A receiver comprising:

an input circuit to receive an input signal;

a feedforward/feedback equalizer responsive to the input circuit;

an error circuit to provide an error signal;

a first D.C. noise canceler to generate a first D.C. noise cancellation signal in response to the error signal from said error circuit, wherein said error circuit is responsive to the first DC noise cancellation signal;

a first adder to subtract the first D.C. noise cancellation signal from said first D.C. noise canceler from an output of said feedforward/feedback equalizer;

a decision circuit that determines an estimate of input signal in response to an output of said first adder, wherein said error circuit comprises:

a second adder to subtract an output of said decision circuit from the error signal output by said first adder;

wherein said first D.C. noise canceler comprises:

a first multiplication circuit to multiply an output of said second adder by a first gain constant to produce a first product;

a third adder; and a first delay circuit responsive to an output from said third adder to generate the first DC noise cancellation signal, wherein said third adder adds an output from a first multiplication circuit to the first D.C. noise cancellation signal; and a second D.C. noise canceler responsive to the error signal from the error circuit and the first D.C. noise cancellation signal from said first D.C. noise canceler to provide a second D.C. noise cancellation signal, wherein said input circuit is responsive to said second D.C. noise canceler, wherein said second D.C. noise canceler comprises:

a fourth adder to add an output of said second adder to the first DC noise cancellation signal;

a second multiplication circuit to multiply an output of said fourth adder by a second gain constant;

a fifth adder; and a second delay circuit responsive to an output of said fifth adder to provide the second D.C. noise cancellation signal, wherein said fifth adder adds the second D.C. noise cancellation signal to an output of said second multiplier, wherein said input circuit comprises a sixth adder to subtract the second D.C. noise cancellation signal from the input signal, wherein the second D.C. noise cancellation signal is formed as a function of the error signal and the first D.C. noise cancellation signal according to the formula:

$$DC2_{n+1} = DC2_n + \mu_{dc2} \times (\epsilon_k + DC1_n)$$

wherein:

$DC2_n$ is the second D.C. noise cancellation signal for the current sampling time of the input signal, $DC2_{n+1}$ is the second D.C. noise cancellation signal for the next sampling time of the input signal, $\mu_{dc2}$ is the second gain constant, $\epsilon_k$ is the error signal determined by the formula:

$$\epsilon_k = f_{knc} - \hat{a}_i$$

where:

$\hat{a}_i$ is the estimated value of the transmitted encoded signal from said decision circuit, $f_{knc}$ is an equalized, noise cancelled received signal of the current sampling from said first adder, and $DC1_n$ is the first D.C. noise cancellation signal for the current sampling time of the input signal.

12. A method to remove D.C. noise components from an input signal received from a communication channel comprising the steps of:
   (a) generating an error signal as an estimate of noise within the input signal;
   (b) generating a first D.C. noise cancellation signal in accordance with the error signal, wherein in step (a) the error signal is generated in accordance with the first D.C. noise signal;
   (c) generating a second D.C. noise cancellation signal in accordance with the error signal and the first D.C. noise cancellation signal; and
   (d) subtracting the second D.C. noise cancellation signal from the input signal.

13. A method according to claim 12, wherein step (a) comprises the steps of:
   (a1) feedforward/feedback equalizing the input signal;
   (a2) subtracting the first D.C. noise cancellation signal from the input signal equalized in step (a1);
   (a3) determining an estimate of the input signal in response to step (a2); and
   (a4) subtracting the estimate from step (a3) from the subtracted signal from step (a2).

14. A method according to claim 13, wherein step (b) comprises the steps of:
   (b1) multiplying the subtracted signal from step (a4) by a first constant;
   (b2) delaying the signal multiplied in step (b1); and
   (b3) adding the delayed signal of step (b2) to the signal multiplied in step (b1).

15. A method to remove D.C. noise components from an input signal received from a communication channel, comprising the steps of:
   (a) generating an error signal as an estimate of noise within the input signal, wherein step (a) comprises the steps of:
      (a1) feedforward/feedback equalizing the input signal;
      (a2) subtracting the first D.C. noise cancellation signal from the input signal equalized in step (a1);
      (a3) determining an estimate of the input signal in response to step (a2); and
      (a4) subtracting the estimate from step (a3) from the subtracted signal from step (a2);
   (b) generating a first D.C. noise cancellation signal in accordance with the error signal, wherein in step (a) the error signal is generated in accordance with the first D.C. noise signal, wherein step (b) comprises the steps of:
      (b1) multiplying the subtracted signal from step (a4) by a first constant:
      (b2) delaying the signal multiplied in step (b1); and
      (b3) adding the delayed signal of step (b2) to the signal multiplied in step (b1);
   (c) generating a second D.C. noise cancellation signal in accordance with the error signal and the first D.C. noise cancellation signal, wherein step (c) comprises the steps of:
      (c1) adding the delayed signal from step (b2) to the subtracted signal of step (a4);
      (c2) multiplying the added signal of step (c1) by a second constant;
      (c3) delaying the signal multiplied in step (c2); and
      (c4) adding the delayed signal of step (c3) to the signal multiplied in step (c2); and
   (d) subtracting the second D.C. noise cancellation signal from the input signal.

16. A method to remove D.C. noise components from an input signal received from a communication channel comprising the steps of:
   (a) generating an error signal as an estimate of noise within the input signal, wherein step (a) comprises the steps of:
      (a1) feedforward/feedback equalizing the input signal;
      (a2) subtracting the first D.C. noise cancellation signal from the input signal equalized in step (a1);
      (a3) determining an estimate of the input signal in response to step (a2); and
      (a4) subtracting the estimate from step (a3) from the subtracted signal from step (a2);
   (b) generating a first D.C. noise cancellation signal in accordance with the error signal, wherein in step (a) the error signal is generated in accordance with the first D.C. noise signal, wherein step (b) comprises the steps of:
      (b1) multiplying the subtracted signal from step (a4) by a first gain constant;
      (b2) delaying the signal multiplied in step (b1); and
      (b3) adding the delayed signal of step (b2) to the signal multiplied in step (b1),
      wherein generating the first D.C. noise cancellation signal is formed as the function of the error signal according to the formula:

$$DC1_{n+1}=DC1_n+\mu_{dc1}\times\epsilon_k$$

wherein:
   $DC1_n$ is the first D.C. noise cancellation signal for the current sampling time of the input signal,
   $DC1_n+1$ is the first D.C. noise cancellation signal for the next sampling time of the input signal,
   $\mu_{dc1}$ is the first gain constant, and
   $\epsilon_k$ is the error signal determined by the formula:

$$\epsilon_k=f_{knc}-\hat{a}_i$$

where:
   $\hat{a}_i$ is the estimated value from step (a3),
   $f_{knc}$ is an equalized, noise cancelled received signal from step (a2);
   (c) generating a second D.C. noise cancellation signal in accordance with the error signal and the first D.C. noise cancellation signal; and
   (d) subtracting the second D.C. noise cancellation signal from the input signal.

17. A method to remove D.C. noise components from an input signal received from a communication channel comprising the steps of:
   (a) generating an error signal as an estimate of noise within the input signal, wherein step (a) comprises the steps of:
      (a1) feedforward/feedback equalizing the input signal;
      (a2) subtracting the first D.C. noise cancellation signal from the input signal equalized in step (a1);
      (a3) determining an estimate of the input signal in response to step (a2); and
      (a4) subtracting the estimate from step (a3) from the subtracted signal from step (a2);
   (b) generating a first D.C. noise cancellation signal in accordance with the error signal, wherein in step (a) the error signal is generated in accordance with the first D.C. noise signal, wherein step (b) comprises the steps of:
 (b1) multiplying the subtracted signal from step (a4) by a first gain constant;
 (b2) delaying the signal multiplied in step (b1); and
 (b3) adding the delayed signal of step (b2) to the signal multiplied in step (b1);
(c) generating a second D.C. noise cancellation signal in accordance with the error signal and the first D.C. noise cancellation signal, wherein step (c) comprises the steps of:
 (c1) adding the delayed signal from step (b2) to the subtracted signal of step (a4);
 (c2) multiplying the added signal of step (c1) by a second gain constant;
 (c3) delaying the signal multiplied in step (c2); and
 (c4) adding the delayed signal of step (c3) to the signal multiplied in step (c2),
 wherein generating the second D.C. noise cancellation signal is formed as a function of the error signal and the first D.C. noise cancellation signal according to the formula:

$$DC1_{n+1}=DC2_n+\mu_{dc2}\times(\epsilon_k+DC1_n)$$

wherein:
  $DC2_n$ is the second D.C. noise cancellation signal for the current sampling time of the input signal,
  $DC2_n+1$ is the second D.C. noise cancellation signal for the next sampling time of the input signal,
  $\mu_{dc2}$ is the second gain constant,
  $\epsilon_k$ is the error signal determined by the formula:

$$\epsilon_k=f_{knc}-\hat{a}_i$$

where:
    $\hat{a}_i$ is the estimated value from step (a3),
    $f_{knc}$ is an equalized, noise cancelled received signal from step (a2), and
    $DC1_n$ is the first D.C. noise cancellation signal from step (b2); and
(d) subtracting the second D.C. noise cancellation signal from the input signal.

18. A noise canceling circuit for removing D.C. noise from an input signal received by a receiver having an error circuit which generates an error signal, said noise canceling circuit comprising:
 first D.C. noise canceling means for generating a first D.C. noise cancellation signal in response to the error signal from the error circuit,
  wherein the first DC noise cancellation signal is input to the error circuit; and
 second D.C. noise canceling means responsive to the error signal from the error circuit and the first D.C. noise cancellation signal from said first D.C. noise canceling means for providing a second D.C. noise cancellation signal.

19. The noise canceling circuit of claim 18, wherein the first D.C. noise canceling means comprises:
 first multiplying means for multiplying the error signal by a first gain constant to produce a first product;
 first adding means; and
 first delay means responsive to an output from said first adding means for generating the first DC noise cancellation signal,
  wherein said first adding means adds an output from a first multiplying means to the first D.C. noise cancellation signal.

20. A noise canceling circuit for removing D.C. noise from an input signal received by a receiver having an error circuit which generates an error signal, said noise canceling circuit comprising:
 first D.C. noise canceling means for generating a first D.C. noise cancellation signal in response to the error signal from the error circuit,
  wherein the first DC noise cancellation signal is input to the error circuit,
  wherein the first D.C. noise canceling means comprises:
   first multiplying means for multiplying the error signal by a first gain constant to produce a first product;
   first adding means; and
   first delay means responsive to an output from said first adding means for generating the first DC noise cancellation signal,
    wherein said first adding means adds an output from a first multiplying means to the first D.C. noise cancellation signal,
  wherein the first D.C. noise cancellation signal is formed as a function of the error signal according to the formula:

$$DC1_n+1=DC1_n+\mu_{dc1}\times\Delta_k$$

wherein:
    $DC1_n$ is the first D.C. noise cancellation signal for the current sampling time of the input signal,
    $DC1_{n+}1$ is the first D.C. noise cancellation signal for the next sampling time of the input signal,
    $\mu_{dc1}$ is the first gain constant, and
    $\epsilon_k$ is the error signal from the error circuit; and
 second D.C. noise canceling means responsive to the error signal from the error circuit and the first D.C. noise cancellation signal from said first D.C. noise canceling means for providing a second D.C. noise cancellation signal.

21. A noise canceling circuit for removing D.C. noise from an input signal received by a receiver having an error circuit which generates an error signal, said noise canceling circuit comprising:
 first D.C. noise canceling means for generating a first D.C. noise cancellation signal in response to the error signal from the error circuit,
  wherein the first DC noise cancellation signal is input to the error circuit; and
 second D.C. noise canceling means responsive to the error signal from the error circuit and the first D.C. noise cancellation signal from said first D.C. noise canceling means for providing a second D.C. noise cancellation signal,
  wherein said second D.C. noise canceling means comprises:
   second adding means for adding the error signal from the error circuit to the first DC noise cancellation signal;
   second multiplying means for multiplying an output of said second adding means by a gain constant;
   third adding means; and
   second delay means responsive to an output of said third adding means for providing the second D.C. noise cancellation signal,
    wherein said third adding means adds the second D.C. noise cancellation signal to an output of said second multiplier.

22. A noise canceling circuit for removing D.C. noise from an input signal received by a receiver having an error circuit which generates an error signal, said noise canceling circuit comprising:
- first D.C. noise canceling means for generating a first D.C. noise cancellation signal in response to the error signal from the error circuit,
  - wherein the first DC noise cancellation signal is input to the error circuit; and
- second D.C. noise canceling means responsive to the error signal from the error circuit and the first D.C. noise cancellation signal from said first D.C. noise canceling means for providing a second D.C. noise cancellation signal,
  - wherein said second D.C. noise canceling means comprises:
    - second adding means for adding the error signal from the error circuit to the first DC noise cancellation signal;
    - second multiplying means for multiplying an output of said second adding means by a gain constant;
    - third adding means; and
    - second delay means responsive to an output of said third adding means for providing the second D.C. noise cancellation signal,
      - wherein said third adding means adds the second D.C. noise cancellation signal to an output of said second multiplier,
  - wherein the second D.C. noise cancellation signal is formed as a function of the error signal and the first D.C. noise cancellation signal according to the formula:

$$DC2_n+1=DC2_n+\mu_{dc2}\times(\epsilon_k+DC1_n)$$

wherein:
- $DC2_n$ is the second D.C. noise cancellation signal for the current sampling time of the input signal,
- $DC2_{n+1}$ is the second D.C. noise cancellation signal for the next sampling time of the input signal,
- $\mu_{dc2}$ is the gain constant, and
- $\epsilon_k$ is the error signal.

23. A receiver comprising:
input means for receiving an input signal;
error means for providing an error signal;
first D.C. noise canceling means for generating a first D.C. noise cancellation signal in response to the error signal from said error means,
  wherein said error means is responsive to the first DC noise cancellation signal; and
second D.C. noise canceling means responsive to the error signal from the error means and the first D.C. noise cancellation signal from said first D.C. noise canceling means for providing a second D.C. noise cancellation signal,
  wherein said input means is responsive to said second D.C. noise canceling means.

24. The receiver of claim 23, further comprising:
feedforward/feed back equalizer means for equalizing an output of the input means;
first adding means for subtracting the first D.C. noise cancellation signal from said first D.C. noise canceling means from an output of said feedforward/feedback equalizer means;
decision means for determining an estimate of input signal in response to an output of said first adding means,
  wherein said error means comprises:
    second adding means for subtracting an output of said decision means from the error signal output by said first adding means.

25. The receiver of claim 24, wherein said first D.C. noise canceling means comprises:
first multiplying means for multiplying an output of said second adding means by a first gain constant to produce a first product;
third adding means; and
first delay means responsive to an output from said third adding means for generating the first DC noise cancellation signal,
  wherein said third adding means adds an output from a first multiplying means to the first D.C. noise cancellation signal.

26. A receiver comprising:
input means for receiving an input signal;
feedforward/feed back equalizer means for equalizing an output of the input means;
error means for providing an error signal;
first D.C. noise canceling means for generating a first D.C. noise cancellation signal in response to the error signal from said error means,
  wherein said error means is responsive to the first DC noise cancellation signal;
first adding means for subtracting the first D.C. noise cancellation signal from said first D.C. noise canceling means from an output of said feedforward/feedback equalizer means;
decision means for determining an estimate of input signal in response to an output of said first adding means,
  wherein said error means comprises:
    second adding means for subtracting an output of said decision means from the error signal output by said first adding means,
  wherein said first D.C. noise canceling means comprises:
    first multiplying means for multiplying an output of said second adding means by a first gain constant to produce a first product;
    third adding means; and
    first delay means to responsive to an output from said third adding means for generating the first DC noise cancellation signal,
      wherein said third adding means adds an output from a first multiplying means to the first D.C. noise cancellation signal; and
second D.C. noise canceling means responsive to the error signal from the error means and the first D.C. noise cancellation signal from said first D.C. noise canceling means for providing a second D.C. noise cancellation signal,
  wherein said input means is responsive to said second D.C. noise canceling means,
  wherein the second D.C. noise canceling means comprises:
    fourth adding means for adding an output of said second adding means to the first DC noise cancellation signal;
    second multiplying means for multiplying an output of said fourth adding means by a second gain constant;
    fifth adding means; and second delay means responsive to an output of said fifth adding means for providing the second D.C. noise cancellation signal,
wherein said fifth adding means adds the second D.C. noise cancellation signal to an output of said second multiplier,
wherein said input means comprises a sixth adding means for subtracting the second D.C. noise cancellation signal from the input signal.

27. A receiver comprising:
input means for receiving an input signal;
feedforward/feed back equalizer means for equalizing an output of the input means;
error means for providing an error signal;
first D.C. noise canceling means for generating a first D.C. noise cancellation signal in response to the error signal from said error means,
wherein said error means is responsive to the first DC noise cancellation signal;
first adding means for subtracting the first D.C. noise cancellation signal from said first D.C. noise canceling means from an output of said feedforward/feedback equalizer means;
decision means for determining an estimate of input signal in response to an output of said first adding means,
wherein said error means comprises:
second adding means for subtracting an output of said decision means from the error signal output by said first adding means
wherein said first D.C. noise canceling means comprises:
first multiplying means for multiplying an output of said second adding means by a first gain constant to produce a first product;
third adding means; and
first delay means to responsive to an output from said third adding means for generating the first DC noise cancellation signal,
wherein said third adding means adds an output from a first multiplying means to the first D.C. noise cancellation signal
wherein the first D.C. noise cancellation signal is formed as a function of the error signal according to the formula:

$$DC1_n+1=DC1_n+\mu_{dc1}\times\epsilon_k$$

wherein:
$DC1_n$ is the first D.C. noise cancellation signal for the current sampling time of the input signal,
$DC1_{n+1}$ is the first D.C. noise cancellation signal for the next sampling time of the input signal,
$\mu_{dc1}$ is the first gain constant, and
$\epsilon_k$ is the error signal determined by the formula:

$$\epsilon_k=f_{knc}-\hat{a}_i$$

where:
$\hat{a}_i$ is the estimated value of the transmitted encoded signal from said decision means, and
$f_{knc}$ is an equalized, noise cancelled received signal of the current sampling from said first adding means; and
second D.C. noise canceling means responsive to the error signal from the error means and the first D.C. noise cancellation signal from said first D.C. noise canceling means for providing a second D.C. noise cancellation signal,
wherein said input means is responsive to said second D.C. noise canceling means.

28. A receiver comprising:
input means for receiving an input signal;
feedforward/feed back equalizer means for equalizing an output of the input means;
error means for providing an error signal;
first D.C. noise canceling means for generating a first D.C. noise cancellation signal in response to the error signal from said error means,
wherein said error means is responsive to the first DC noise cancellation signal;
first adding means for subtracting the first D.C. noise cancellation signal from said first D.C. noise canceling means from an output of said feedforward/feedback equalizer means;
decision means for determining an estimate of input signal in response to an output of said first adding means,
wherein said error means comprises:
second adding means for subtracting an output of said decision means from the error signal output by said first adding means,
wherein said first D.C. noise canceling means comprises:
first multiplying means for multiplying an output of said second adding means by a first gain constant to produce a first product;
third adding means; and
first delay means to responsive to an output from said third adding means for generating the first DC noise cancellation signal,
wherein said third adding means adds an output from a first multiplying means to the first D.C. noise cancellation signal; and
second D.C. noise canceling means responsive to the error signal from the error means and the first D.C. noise cancellation signal from said first D.C. noise canceling means for providing a second D.C. noise cancellation signal,
wherein said input means is responsive to said second D.C. noise canceling means,
wherein the second D.C. noise canceling means comprises:
fourth adding means for adding an output of said second adding means to the first DC noise cancellation signal;
second multiplying means for multiplying an output of said fourth adding means by a second gain constant;
fifth adding means; and
second delay means responsive to an output of said fifth adding means for providing the second D.C. noise cancellation signal,
wherein said fifth adding means adds the second D.C. noise cancellation signal to an output of said second multiplier,
wherein said input means comprises a sixth adding means for subtracting the second D.C. noise cancellation signal from the input signal;
wherein the second D.C. noise cancellation signal is formed as a function of the error signal and the first D.C. noise cancellation signal according to the formula:

$$DC2_n+1=DC2_n+\mu_{dc2}\times(\epsilon_k+DC1_n)$$

wherein:

DC2$_n$ is the second D.C. noise cancellation signal for the current sampling time of the input signal, DC2$_n$+1 is the second D.C. noise cancellation signal for the next sampling time of the input signal, $\mu_{dc2}$ is the second gain constant, $\epsilon_k$ is the error signal determined by the formula:

$$\epsilon_k = f_{knc} - \hat{a}_i$$

where:

$\hat{a}_i$ is the estimated value of the transmitted encoded signal from said decision means, $f_{knc}$ is an equalized, noise cancelled received signal of the current sampling from said first adding means, and DC1$_n$ is the first D.C. noise cancellation signal for the current sampling time of the input signal.

29. A computer medium for obtaining program code to remove D.C. noise components from an input signal received from a communication channel for execution on a processor, the program code comprising the steps of:

(a) generating an error signal as an estimate of noise within the input signal;

(b) generating a first D.C. noise cancellation signal in accordance with the error signal, wherein in step (a) the error signal is generated in accordance with the first D.C. noise signal;

(c) generating a second D.C. noise cancellation signal in accordance with the error signal and the first D.C. noise cancellation signal; and (d) subtracting the second D.C. noise cancellation signal from the input signal.

30. A method according to claim 29, wherein step (a) comprises the steps of:

(a1) feedforward/feedback equalizing the input signal;

(a2) subtracting the first D.C. noise cancellation signal from the input signal equalized in step (a1);

(a3) determining an estimate of the input signal in response to step (a2); and (a4) subtracting the estimate from step (a3) from the subtracted signal from step (a2).

31. A method according to claim 30, wherein step (b) comprises the steps of:

(b1) multiplying the subtracted signal from step (a4) by a first constant;

(b2) delaying the signal multiplied in step (b1); and (b3) adding the delayed signal of step (b2) to the signal multiplied in step (b1).

32. A computer medium for obtaining program code to remove D.C. noise components from an input signal received from a communication channel for execution on a processor, the program code comprising the steps of:

(a) generating an error signal as an estimate of noise within the input signal, wherein step (a) comprises the steps of:

(a1) feedforward/feedback equalizing the input signal;

(a2) subtracting the first D.C. noise cancellation signal from the input signal equalized in step (a1);

(a3) determining an estimate of the input signal in response to step (a2); and (a4) subtracting the estimate from step (a3) from the subtracted signal from step (a2);

(b) generating a first D.C. noise cancellation signal in accordance with the error signal, wherein in step (a) the error signal is generated in accordance with the first D.C. noise signal, wherein step (b) comprises the steps of:

(b1) multiplying the subtracted signal from step (a4) by a first constant;

(b2) delaying the signal multiplied in step (b1); and (b3) adding the delayed signal of step (b2) to the signal multiplied in step (b1);

(c) generating a second D.C. noise cancellation signal in accordance with the error signal and the first D.C. noise cancellation signal, wherein step (c) comprises the steps of:

(c1) adding the delayed signal from step (b2) to the subtracted signal of step (a4);

(c2) multiplying the added signal of step (c1) by a second constant;

(c3) delaying the signal multiplied in step (c2); and (c4) adding the delayed signal of step (c3) to the signal multiplied in step (c2); and (d) subtracting the second D.C. noise cancellation signal from the input signal.

33. A computer medium for obtaining program code to remove D.C. noise components from an input signal received from a communication channel for execution on a processor, the program code comprising the steps of:

(a) generating an error signal as an estimate of noise within the input signal;

wherein step (a) comprises the steps of:

(a1) feedforward/feedback equalizing the input signal;

(a2) subtracting the first D.C. noise cancellation signal from the input signal equalized in step (a1);

(a3) determining an estimate of the input signal in response to step (a2); and (a4) subtracting the estimate from step (a3) from the subtracted signal from step (a2);

(b) generating a first D.C. noise cancellation signal in accordance with the error signal, wherein in step (a) the error signal is generated in accordance with the first D.C. noise signal;

wherein step (b) comprises the steps of:

(b1) multiplying the subtracted signal from step (a4) by a first gain constant;

(b2) delaying the signal multiplied in step (b1); and (b3) adding the delayed signal of step (b2) to the signal multiplied in step (b1), wherein generating the first D.C. noise cancellation signal is formed as the function of the error signal according to the formula:

$$DC1_n + 1 = DC1_n + \mu_{dc1} \times \epsilon_k$$

wherein:

DC1$_n$ is the first D.C. noise cancellation signal for the current p sampling time of the input signal, DC1$_{n+1}$ is the first D.C. noise cancellation signal for the next sampling time of the input signal, $\mu_{dc1}$ is the first gain constant, $\epsilon_k$ is the error signal determined by the formula:

$$\epsilon_k = f_{knc} - \hat{a}_i$$

where:

$\hat{a}_i$ is the estimated value from step (a3), $f_{knc}$ is an equalized, noise cancelled received signal from step (a2);

(c) generating a second D.C. noise cancellation signal in accordance with the error signal and the first D.C. noise cancellation signal; and (d) subtracting the second D.C. noise cancellation signal from the input signal.

34. A computer medium for obtaining program code to remove D.C. noise components from an input signal received from a communication channel for execution on a processor, the program code comprising the steps of:
(a) generating an error signal as an estimate of noise within the input signal;
wherein step (a) comprises the steps of:
(a1) feedforward/feedback equalizing the input signal;
(a2) subtracting the first D.C. noise cancellation signal from the input signal equalized in step (a1);
(a3) determining an estimate of the input signal in response to step (a2); and
(a4) subtracting the estimate from step (a3) from the subtracted signal from step (a2);
(b) generating a first D.C. noise cancellation signal in accordance with the error signal, wherein in step (a) the error signal is generated in accordance with the first D.C. noise signal;
wherein step (b) comprises the steps of:
(b1) multiplying the subtracted signal from step (a4) by a first gain constant;
(b2) delaying the signal multiplied in step (b1); and
(b3) adding the delayed signal of step (b2) to the signal multiplied in step (b1);
(c) generating a second D.C. noise cancellation signal in accordance with the error signal and the first D.C. noise cancellation signal
wherein step (c) comprises the steps of:
(c1) adding the delayed signal from step (b2) to the subtracted signal of step (a4);
(c2) multiplying the added signal of step (c1) by a second gain constant;
(c3) delaying the signal multiplied in step (c2); and
(c4) adding the delayed signal of step (c3) to the signal multiplied in step (c2),
wherein generating the second D.C. noise cancellation signal is formed as a function of the error signal and the first D.C. noise cancellation signal according to the formula:

$$DC2_n+1=DC2_n+\mu_{dc2}\times(\epsilon_k+DC1_n)$$

wherein:
$DC2_n$ is the second D.C. noise cancellation signal for the current sampling time of the input signal,
$DC2_n+1$ is the second D.C. noise cancellation signal for the next sampling time of the input signal,
$\mu_{dc2}$ is the second gain constant,
$\epsilon_k$ is the error signal determined by the formula:

$$\epsilon_k=f_{knc}-\hat{a}_i$$

where:
$\hat{a}_i$ is the estimated value from step (a3),
$f_{knc}$ is an equalized, noise cancelled received signal from step (a2), and
$DC1_n$ is the first D.C. noise cancellation signal from step (b2); and
(d) subtracting the second D.C. noise cancellation signal from the input signal.

35. A noise canceling circuit for removing D.C. noise from an input signal received by a receiver having an error circuit which generates an error signal, the noise canceling circuit comprising:
a first D.C. noise canceler to generate a first D.C. noise cancellation signal in response to the error signal from the error circuit,
wherein the first DC noise cancellation signal is input to the error circuit; and
a second D.C. noise canceler responsive to the error signal from the error circuit and the first D.C. noise cancellation signal from the first D.C. noise canceler to provide a second D.C. noise cancellation signal,
wherein the second D.C. noise cancellation signal is input to the receiver to cancel the D.C. noise from the input signal.

36. The noise canceling circuit of claim 35, wherein the first D.C. noise canceler comprises:
a first multiplication circuit to multiply the error signal by a first gain constant to produce a first product;
a first adder; and
a first delay circuit responsive to an output from the first adder to generate the first DC noise cancellation signal,
wherein the first adder adds an output from the first multiplication circuit to the first D.C. noise cancellation signal.

37. The noise canceling circuit of claim 35, wherein the second D.C. noise canceler comprises:
a first adder to add the error signal from the error circuit to the first DC noise cancellation signal;
a first multiplication circuit to multiply an output of the first adder by a first gain constant;
a second adder; and
a first delay circuit responsive to an output of the second adder to provide the second D.C. noise cancellation signal,
wherein the second adder adds the second D.C. noise cancellation signal to an output of the first multiplication circuit.

38. A noise canceling circuit for removing D.C. noise from an input signal received by a receiver having an error circuit which generates an error signal, the noise canceling circuit comprising:
a first D.C. noise canceler to generate a first D.C. noise cancellation signal in. response to the error signal from the error circuit,
wherein the first D.C. noise canceler comprises:
a first multiplication circuit to multiply the error signal by a first gain constant to produce a first product;
a first adder; and
a first delay circuit responsive to an output from the first adder to generate the first DC noise cancellation signal,
wherein the first adder adds an output from the first multiplication circuit to the first D.C. noise cancellation signal,
wherein the first D.C. noise cancellation signal is formed as a function of the error signal according to the formula:

$$DC1_n+1=DC1_n+\mu_{dc1}\times\epsilon_k$$

wherein:
$DC1_n$ is the first D.C. noise cancellation signal for a current sampling time of the input signal,
$DC1_n+1$ is the first D.C. noise cancellation signal for a next sampling time of the input signal,
$\mu_{dc1}$ is the first gain constant, and
$\epsilon_k$ is the error signal from the error circuit,
wherein the first DC noise cancellation signal is input to the error circuit; and
a second D.C. noise canceler responsive to the error signal from the error circuit and the first D.C. noise cancellation signal from the first D.C. noise canceler to provide a second D.C. noise cancellation signal,
wherein the second D.C. noise cancellation signal is input to the receiver to cancel the D.C. noise from the input signal.

39. A noise canceling circuit for removing D.C. noise from an input signal received by a receiver having an error circuit which generates an error signal, the noise canceling circuit comprising:

a first D.C. noise canceler to generate a first D.C. noise cancellation signal in response to the error signal from the error circuit,
wherein the first DC noise cancellation signal is input to the error circuit; and a second D.C. noise canceler responsive to the error signal from the error circuit and the first D.C. noise cancellation signal from the first D.C. noise canceler to provide a second D.C. noise cancellation signal,
wherein the second D.C. noise canceler comprises:
a first adder to add the error signal from the error circuit to the first DC noise cancellation signal;
a first multiplication circuit to multiply an output of the first adder by a first gain constant;
a second adder; and
a first delay circuit responsive to an output of the second adder to provide the second D.C. noise cancellation signal,
wherein the second adder adds the second D.C. noise cancellation signal to an output of the first multiplication circuit,
wherein the second D.C. noise cancellation signal is formed as a function of the error signal and the first D.C. noise cancellation signal according to the formula:

$$DC2_n+1=DC2_n+\mu_{dc2}\times(\epsilon_k+DC1_n)$$

wherein:
$DC2_n$ is the second D.C. noise cancellation signal for a current sampling time of the input signal,
$DC2_n+1$ is the second D.C. noise cancellation signal for a next sampling time of the input signal,
$\mu_{dc2}$ is the first gain constant,
$\epsilon_k$ is the error signal, and
$DC1_n$ is the first D.C. noise cancellation signal for the current sampling time of the input signal, and
wherein the second D.C. noise cancellation signal is input to the receiver to cancel the D.C. noise from the input signal.

40. A noise canceling circuit for removing D.C. noise from an input signal received by a receiver having an error circuit which generates an error signal, the noise canceling circuit comprising:

first D.C. noise canceling means for generating a first D.C. noise cancellation signal in response to the error signal from the error circuit,
wherein the first DC noise cancellation signal is input to the error circuit; and second D.C. noise canceling means responsive to the error signal from the error circuit and the first D.C. noise cancellation signal from the first D.C. noise canceling means for providing a second D.C. noise cancellation signal,
wherein the second D.C. noise cancellation signal is input to the receiver to cancel the D.C. noise from the input signal.

41. The noise canceling circuit of claim 40, wherein the first D.C. noise canceling means comprises:

first multiplying means for multiplying the error signal by a first gain constant to produce a first product;
first adding means; and
first delay means responsive to an output from the first adding means for generating the first DC noise cancellation signal,
wherein the first adding means adds an output from the first multiplying means to the first D.C. noise cancellation signal.

42. The noise canceling circuit of claim 40, wherein the second D.C. noise canceling means comprises:

first adding means for adding the error signal from the error circuit to the first DC noise cancellation signal;
first multiplying means for multiplying an output of the first adding means by a first gain constant;
second adding means; and
first delay means responsive to an output of the second adding means for providing the second D.C. noise cancellation signal,
wherein the second adding means adds the second D.C. noise cancellation signal to an output of the first multiplying means.

43. A noise canceling circuit for removing D.C. noise from an input signal received by a receiver having an error circuit which generates an error signal, the noise canceling circuit comprising:

first D.C. noise canceling means for generating a first D.C. noise cancellation signal in response to the error signal from the error circuit,
wherein the first D.C. noise canceling means comprises:
first multiplying means for multiplying the error signal by a first gain constant to produce a first product;
first adding means; and
first delay means responsive to an output from the first adding means for generating the first DC noise cancellation signal,
wherein the first adding means adds an output from the first multiplying means to the first D.C. noise cancellation signal,
wherein the first D.C. noise cancellation signal is formed as a function of the error signal according to the formula:

$$DC1_n+1=DC1_n+\mu_{dc1}\times\epsilon_k$$

wherein:
$DC1_n$ is the first D.C. noise cancellation signal for a current sampling time of the input signal,
$DC1_n+1$ is the first D.C. noise cancellation signal for a next sampling time of the input signal,
$\mu_{dc1}$ is the first gain constant, and
$\epsilon_k$ is the error signal from the error circuit and
wherein the first DC noise cancellation signal is input to the error circuit; and second D.C. noise canceling means responsive to the error signal from the error circuit and the first D.C. noise cancellation signal from the first D.C. noise canceling means for providing a second D.C. noise cancellation signal;
wherein the second D.C. noise cancellation signal is input to the receiver to cancel the D.C. noise from the input signal.

44. A noise canceling circuit for removing D.C. noise from an input signal received by a receiver having an error circuit which generates an error signals the noise canceling circuit comprising:

first D.C. noise canceling means for generating a first D.C. noise cancellation signal in response to the error signal from the error circuit,
wherein the first DC noise cancellation signal is input to the error circuit; and second D.C. noise canceling means responsive to the error signal from the error circuit and the first D.C. noise cancellation signal from the first D.C. noise canceling means for providing a second D.C. noise cancellation signal,
wherein the second D.C. noise canceling means comprises:
first adding means for adding the error signal from the error circuit to the first DC noise cancellation signal,
first multiplying means for multiplying an output of the first adding means by a first gain constant:
second adding means; and
first delay means responsive to an output of the second adding means for providing the second D.C. noise cancellation signal, wherein the second adding means adds the second D.C. noise cancellation signal to an output of the first multiplying means,
wherein the second D.C. noise cancellation signal is formed as a function of the error signal and the first D.C. noise cancellation signal according to the formula:

$$DC2_n+1=DC2_n+\mu_{dc2} \times \epsilon_k$$

wherein:
$DC2_n$ is the first D.C. noise cancellation signal for a current sampling time of the input signal,
$DC2_n+1$ is the first D.C. noise cancellation signal for a next sampling time of the input signal,
$\mu_{dc2}$ is the first gain constant, and
$\epsilon_k$ is the error signal from the error circuit and
$DC1_n$ is the first D.C. noise cancellation signal for the current sampling time of the input signal, and
wherein the second D.C. noise cancellation signal is input to the receiver to cancel the D.C. noise from the input signal.

* * * * *